Patented Aug. 11, 1953

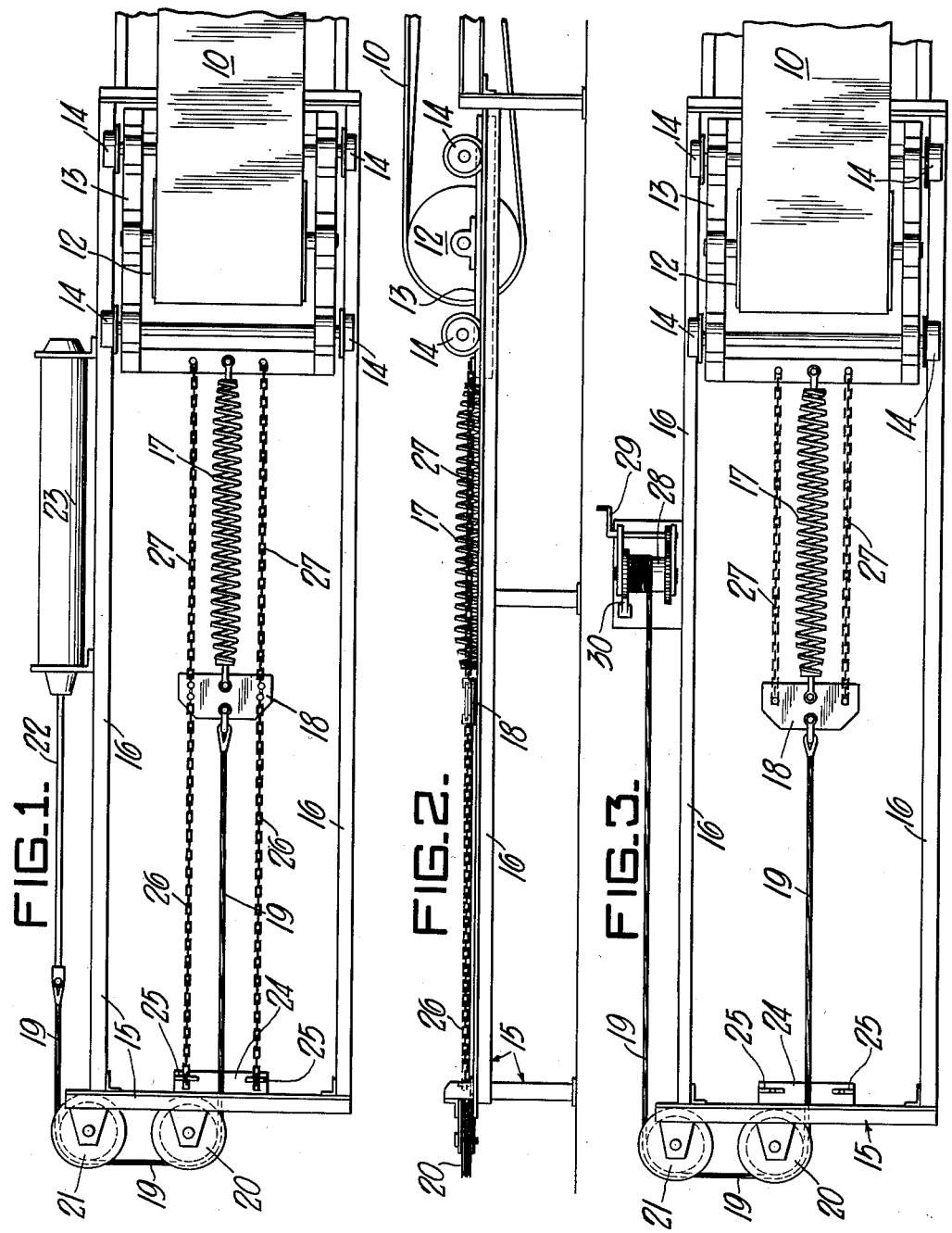

2,648,424

UNITED STATES PATENT OFFICE 2,648,424

TENSIONING DEVICE FOR CONVEYER BELTS

Robert N. Bateman, Duluth, Minn., assignor to United States Steel Corporation, a corporation of New Jersey Application March 15, 1950, Serial No. 149,678

1 Claim. (Cl. 198—208)

This invention relates to improved tensioning devices for conveyor belts.

An object of the invention is to provide improved tensioning devices which occupy little space and therefore are particularly suitable for confined locations, such as underground mines.

A further object of the invention is to provide improved tensioning devices which have means for initially developing spring tension in a conveyor belt, positive means for holding the tension thus developed, and means for restraining the belt if the spring breaks.

In accomplishing these and other objects of the invention, I have provided improved details of structure, preferred forms of which are shown in the accompanying drawing, in which:

Figure 1 is a top plan view of a portion of a conveyor which is equipped with an improved tensioning device embodying features of the present invention;

Figure 2 is a side elevational view of the structure shown in Figure 1; and

Figure 3 is a top plan view similar to Figure 1 but showing a modified tensioning device.

Figures 1 and 2 show an endless conveyor belt 10 and a take-up pulley 12 around which said belt runs. A carriage 13 rotatably supports said pulley. Carriage 13 has rollers 14 and is supported on a stand 15, which has rails 16 for said rollers.

In accordance with the present invention, one end of a spring 17 is attached to carriage 13 and a yoke 18 is attached to the other end of said spring. A cable 19 is attached to said yoke, extends around pulleys 20 and 21 on the end of stand 15, and back to a piston rod 22. This piston rod is connected to a piston which is reciprocably carried in a fixed air cylinder 23. The farther the piston is retracted within the cylinder, the greater the tension it develops in spring 17 and in the conveyor belt. While Figures 1 and 2 show two pulleys 20 and 21 on the end of stand 15 and cylinder 23 mounted on the side of said stand, it is apparent that the arrangement of pulleys and cylinder can be varied without departing from the invention. If desired, spring 17 can be wound with initial tension, which causes its coils to separate as soon as the slack is removed. The spacing between coils then furnishes a convenient measure of tension in the belt.

The forward end of stand 15 has a fitting 24 which carries a pair of upstanding slotted ears 25. A pair of chains 26 are attached to yoke 18 and can be inserted in the slots of said ears for positively holding the spring and belt in tension once the air cylinder has developed the desired tension in these parts. Initially air is admitted to the cylinder to retract the piston and piston rod until the desired tension is developed. Then chains 26 are inserted in the slots and furnish a positive tensioning means. The air then can be released from the cylinder.

A second pair of chains 27 are connected between carriage 13 and yoke 18. When the belt is tensioned properly, these latter chains are somewhat slack. However, if spring 17 breaks, these latter chains restrain the carriage and conveyor belt from moving any appreciable distance.

Figure 3 shows a modification in which a winch 28 replaces the air cylinder. Cable 19 extends around pulleys 20 and 21 as before, but is wound around winch 28. This winch has an operating handle 29 and a pawl and ratchet 30 for preventing unwinding of the cable. Therefore the winch is effective for tensioning the spring and belt the same as the air cylinder. Since the pawl and ratchet 30 positively hold cable 19, chains 26 ordinarily are not needed although they can be included if desired.

From the foregoing description it is seen that I have provided an improved tensioning device which requires little space and which is capable of developing any desired tension in a conveyor belt and thereafter positively holding the belt under this tension. This structure is rugged and simple mechanically and is particularly suited for confined locations.

While I have shown and described certain preferred embodiments of the invention, it is apparent that modifications may arise. Therefore, I do not wish to be limited to the disclosure set forth but only by the scope of the appended claim.

I claim:

A tensioning device for a conveyor belt comprising a fixed stand having a pair of spaced apart longitudinally extending rails and a transverse end member connected between said rails, a carriage having rollers movably mounted on said rails and a take-up pulley for the belt, an initially tensioned coil spring attached at one end to said carriage, a yoke attached to the other end of said spring, a flexible cable attached to said yoke, a pair of pulleys mounted on the outside of said end member and being rotatable on vertical axes, said cable extending past said end member, around said pulleys and back along the outside of one of said rails, a fluid pressure cylinder fixed to the outside of this rail, a piston reciprocable in said cylinder and connected to said cable for pulling the cable and thereby developing tension in said spring, flexible elements extending between said yoke and said end member on opposite sides of said cable for positively holding the spring and belt under the tension thus developed, and flexible means connected between said yoke and said carriage on opposite sides of said spring for restraining the carriage in the event of failure of said spring, the spacing between the coils of said spring furnishing a measure of the tension therein.

ROBERT N. BATEMAN.

References Cited in the file of this patent

UNITED STATES PATENTS

| Number | Name | Date |
|---|---|---|
| 592,111 | Gilman | Oct. 19, 1897 |
| 1,422,252 | Boreiko | July 11, 1922 |
| 1,663,344 | Lennard | Mar. 20, 1928 |
| 1,770,934 | Levin | July 22, 1930 |
| 2,452,980 | Beltz | Nov. 2, 1948 |
| 2,463,273 | Holstein | Mar. 1, 1949 |
| 2,628,707 | Shacikoski | Feb. 17, 1953 |

FOREIGN PATENTS

| Number | Country | Date |
|---|---|---|
| 672,954 | Germany | Mar. 17, 1939 |
| 587,114 | Great Britain | Apr. 15, 1947 |